United States Patent
Garcia et al.

(10) Patent No.: US 7,226,179 B2
(45) Date of Patent: Jun. 5, 2007

(54) OPTICAL ALIGNMENT SYSTEM FOR POWER TOOLS

(75) Inventors: Jaime E. Garcia, Jackson, TN (US); Jeffrey D. Weston, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 57 days.

(21) Appl. No.: 11/143,918

(22) Filed: Jun. 2, 2005

(65) Prior Publication Data

US 2005/0270531 A1 Dec. 8, 2005

Related U.S. Application Data

(60) Provisional application No. 60/576,750, filed on Jun. 2, 2004.

(51) Int. Cl.
*F21V 33/00* (2006.01)

(52) U.S. Cl. .......................... 362/89; 362/259; 83/520; 83/521

(58) Field of Classification Search .................. 362/89, 362/259; 83/520, 521
See application file for complete search history.

(56) References Cited

U.S. PATENT DOCUMENTS

| | | | |
|---|---|---|---|
| 299,619 A | 6/1884 | Carson | |
| 408,790 A | 8/1889 | Butler | |
| 411,925 A | 10/1889 | Linderman | |
| 714,098 A | 11/1902 | Caldwell | |
| 5,967,645 A | * | 10/1999 | Anderson ................. 362/259 |
| 6,976,764 B2 | * | 12/2005 | Cheng et al. ............... 362/89 |

OTHER PUBLICATIONS

"Product Picks from the National Hardware Show"; Fall Homes 1992; Sep. 23, 1992; 2 pages.
"Delta, Building Trades and Home Shop Machinery"; Catalog published in Jan. 1993; (see generally pp. 5-25), 84 pages.
Craftsman Operator's Manual, "Laser Compound Miter Saw with Retractable Laser Trac® System, Model No. 137.212540," Part No. 137212540001; Sears, Roebuck and Co., Hoffman Estates, IL 60179; www.sears.com/craftsman: © Sears, Roebuck and Co.; 34 pages.
"Hitachi Model C 10FSH and C 10FSB Slide Compound Saw, Safety Instructions and Instruction Manual," issued by Hitachi Koki Co., Ltd., Shinagawa Intercity Tower A, 15-1, Konan 2-chome, Minato-ku, Tokyo 108-6020, Japan; pp. 1-30, 88, 90, and 92; 33 pages.

* cited by examiner

*Primary Examiner*—Stephen F Husar
(74) *Attorney, Agent, or Firm*—Adan Ayala

(57) ABSTRACT

An optical alignment system. In an embodiment, the system includes an optical emitting device for projecting an optical indicator onto a workpiece surface area. Further, a lateral arm may be coupled to the optical emitting device for supporting such device. In addition, a vertical support is constructed to receive the lateral arm allowing the lateral arm and optical emitting device to cantilever over the workpiece surface area. Moreover, a securing mechanism for securing the vertical support to the workpiece surface area such as a horizontal platform may be included. Additionally, at least one optical emitting device housing which substantially encloses the optical emitting device is present for operationally coupling the optical device to the lateral arm. The at least one optical emitting device housing is configured so that the optical emitting device may cantilever above the workpiece surface area and project a line-of-cut indicator onto the workpiece surface area.

19 Claims, 4 Drawing Sheets

OPTICAL ALIGNMENT SYSTEM FOR POWER TOOLS

CROSS REFERENCE TO RELATED APPLICATIONS

The present application claims the benefit under 35 U.S.C. § 119(e) of U.S. Provisional Application Ser. No. 60/576,750, filed Jun. 2, 2004 which is herein incorporated by reference in its entirety.

FIELD OF INVENTION

The present invention relates generally to accessories for power tools, and more particularly to a system and method for providing adjustable optical alignment for power tools.

BACKGROUND OF THE INVENTION

Power tools are commonly used by professional carpenters, as well as by hobbyists. Carpentry projects require precision when making cuts, particularly with the alignment of the cut. These precise cuts typically require an operator to draw a line on the surface of the material prior to making a cut. This method has inherent disadvantages, as the line may not be straight, or may be difficult to perceive.

Various alignment devices have been used to provide a line of cut indication for a variety of carpentry tools. For instance, a fence may be employed to position a workpiece so that a kerf or channel may be formed in a desired location within the workpiece. However, use of the fence is limited by the requirement of continual fence re-alignment to accommodate different workpieces and positions as well as the ability to adjust the fence smoothly or accurately. In addition, a tool which slides into a slot formed within a power tool such as a table saw, router table, band saw, and the like is often utilized to make square or angled cuts. For example, a miter gauge which may be adjusted to different angles may be employed to guide a workpiece past the saw blade. However, in order determine the site at which the saw blade will enter the workpiece, a user is often required to perform a number of test cuts prior to arriving at the proper setting of the miter gauge. The requirement of multiple test cuts is not only tedious, but filled with imprecision.

Therefore, it would be desirable to provide a system which is capable of attachment to a workbench or other surface which projects a line-of-cut indication onto a workpiece surface area eliminating the need for multiple test cuts, continuous fence re-alignment, and workpiece mark-up.

SUMMARY OF THE INVENTION

Accordingly, the present invention is directed to an optical alignment system. In accordance with a first aspect of the present invention, the optical alignment system includes an optical emitting device for projecting an optical indicator onto a workpiece surface area. Further, a lateral arm is coupled to the optical emitting device for supporting such device. A vertical support may be constructed to receive the lateral arm allowing the lateral arm and optical emitting device to cantilever over the workpiece surface area. The vertical support may be secured to the workpiece surface area via a securing mechanism such as a horizontal platform. Additionally, an optical emitting device housing which substantially encloses the optical emitting device is present for operationally coupling the optical device to the lateral arm. Such housing is configured so that the optical emitting device may cantilever above the workpiece surface area and project a line-of-cut indicator onto the workpiece surface area.

In accordance with further aspects of the present invention, the optical emitting device is a laser such as a helium-neon laser. In an exemplary aspect, the horizontal platform is configured to be positioned within a slot defined within the workpiece surface area. In an additional exemplary aspect, more than one housing may be employed to house the laser. For example, a first laser housing or interior housing may be included to substantially enclose the laser and to protect the laser from dust and debris. Moreover, a second laser housing or exterior housing may be included to allow the interior laser housing including the laser to be secured to the lateral arm. In an aspect, the exterior laser housing may include a recess constructed to receive the interior laser housing and an aperture formed within one end of the exterior laser housing allowing the exterior laser housing to be coupled to the lateral arm.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
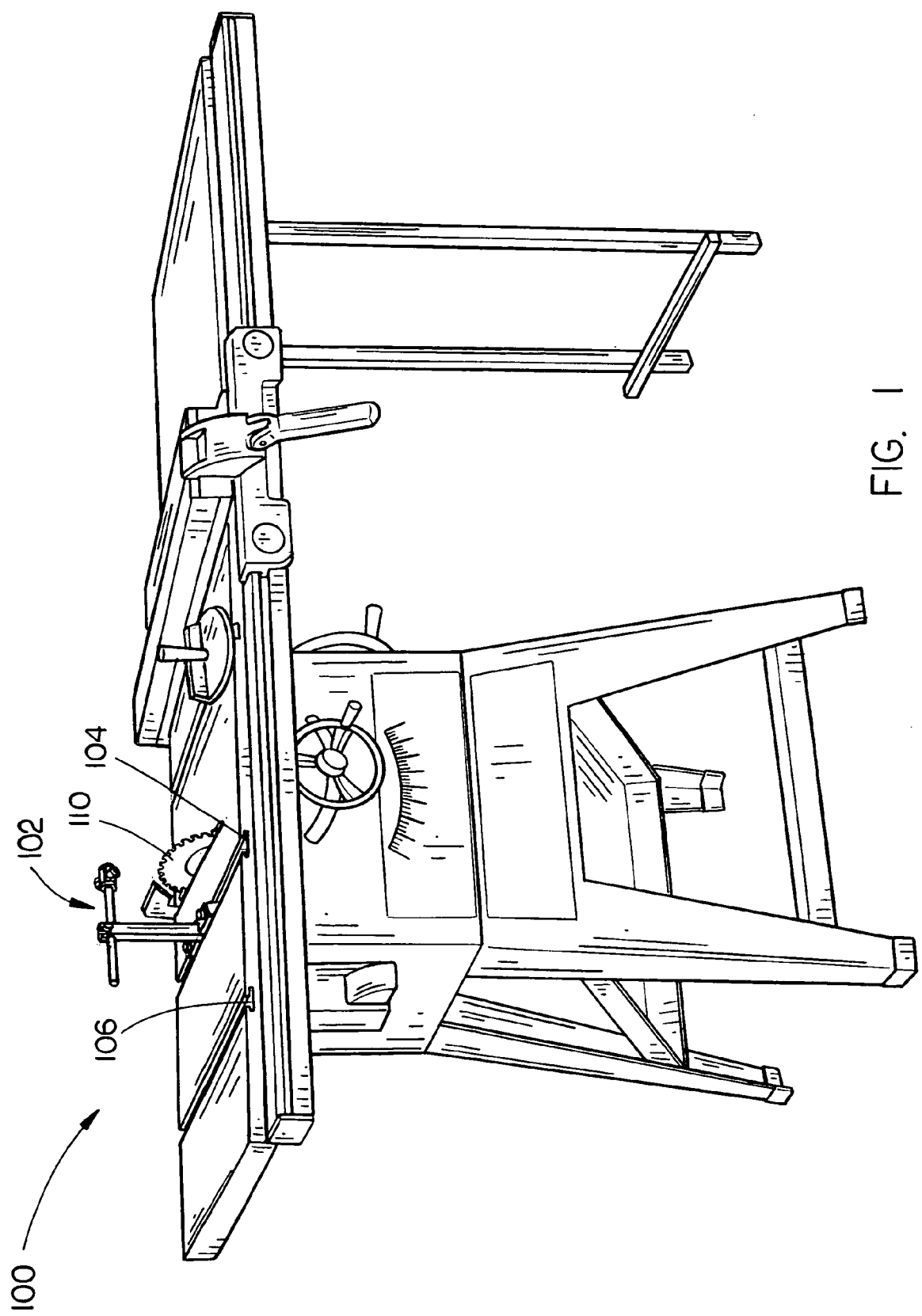
FIG. 1 is an isometric view of a table saw in accordance with an exemplary embodiment of the present invention, wherein the table saw includes an adjustable optical alignment system.

Referring to FIG. 1, a table saw assembly 100 in accordance with the present invention in which such assembly includes an optical alignment system 102 is provided. As illustrated in FIG. 1, the table saw assembly 100 includes a first slot 104 and a second T-slot 106 generally provided for accepting a miter guide. In the embodiment, the first T-slot 104 and the second T-slot 106 extend parallel to a saw blade 110 included with the table saw assembly 100. In accordance with the present invention, the optical alignment system 102 may be secured within one of the T-slots (e.g., the first T-slot 104 or the second T-slot 106) to provide a line-of-cut indicator to a work surface. Although the optical alignment system 102 is illustrated with a table saw, it is contemplated that such system 102 may also be used with other power tools such as bandsaws, drill presses, shapers, panel saws, and the like. It is further contemplated that the slot shape may be varied to accept varied shaped guides. In addition, such system may be particularly useful for use with tools in which the workpiece is manipulated with respect to a working element.

Figure 2:
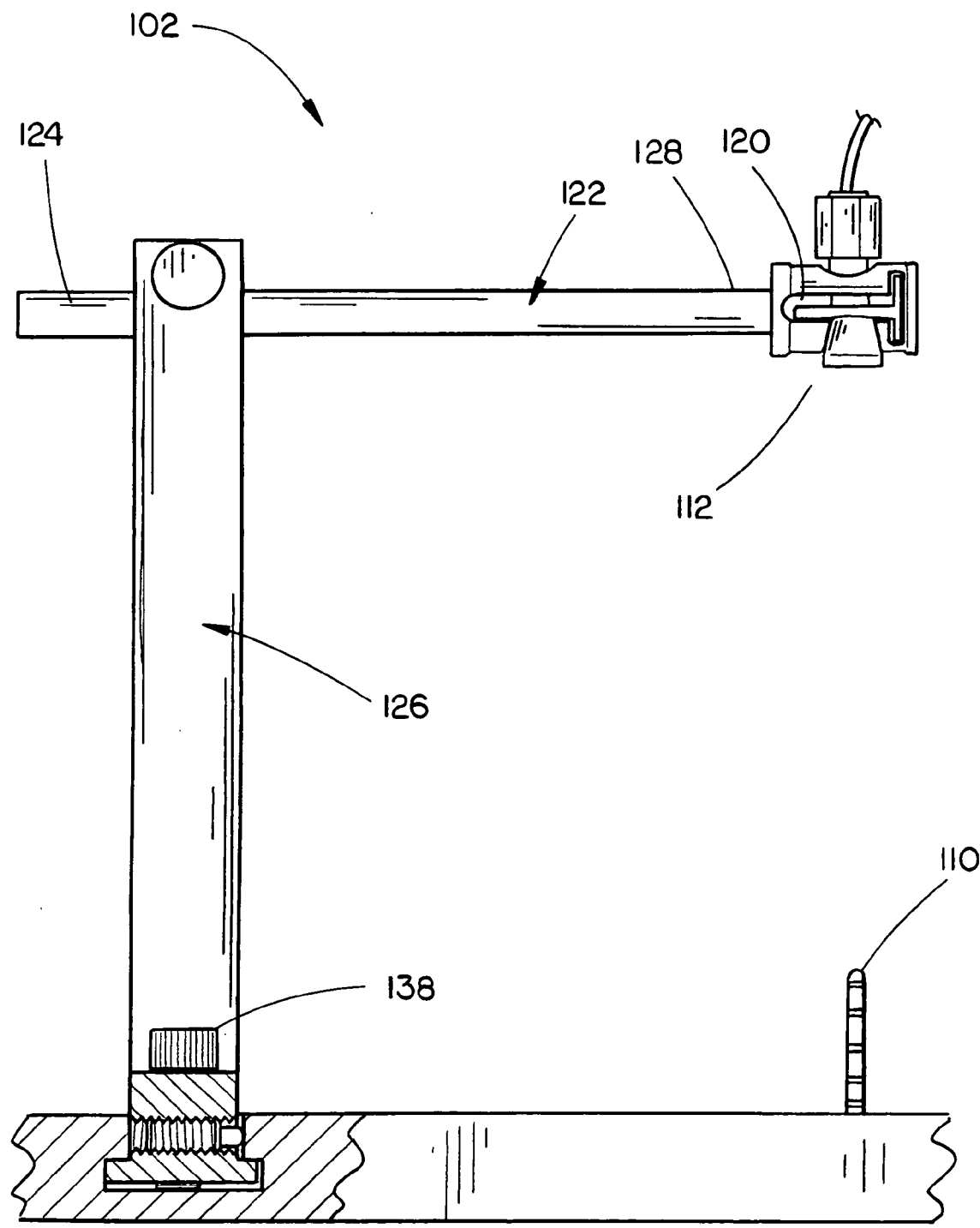
FIG. 2 is a cross-sectional side view of an optical alignment system in accordance with an exemplary embodiment of the present invention, wherein the optical alignment system is cantilever above a work surface area.
Figure 3:
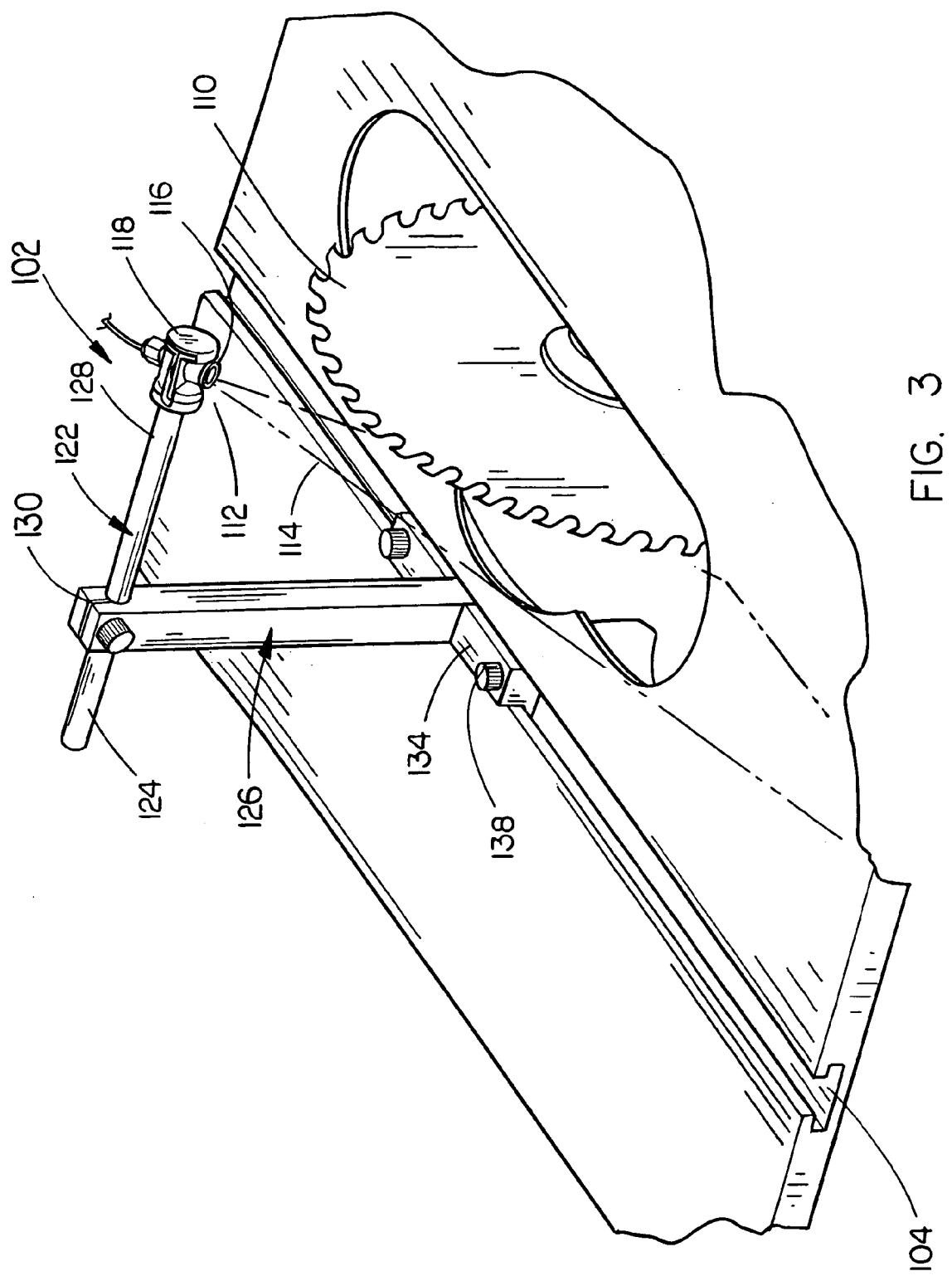
FIG. 3 is a partial isometric view of an optical alignment system in accordance with an exemplary embodiment of the present invention, wherein the optical alignment system is mounted to a workbench and is directing a light beam onto the cutting path.

Referring to FIGS. 2 and 3, an exemplary optical alignment system 102 is shown. In the exemplary embodiment, the optical alignment system 102 includes a light source 112 for projecting a beam of visible light onto a workpiece. In an embodiment, the light source 112 is a coherent light source such as a laser, for example, a HeNe laser, a diode laser and the like. An HeNe laser may be advantageous for it generates a highly visible indicator under most situations while requiring a minimal amount of power in comparison with other lasers.

In a further exemplary embodiment, the light source 112 is channeled into a beam which may be projected as a solid, dashed, or dotted line, an arrow, or the like may attenuate along a non-linear path, depending upon the preference of the operator. For example, upon activation the light source 112 directs a beam of light 114 onto the cutting path of the blade, providing accurate line-of-cut indication for the operator. The optical indicator may be aligned with the side of a saw kerf, a channel formed in a workpiece by operation of the working element, i.e. generally the edge of a saw blade tooth.

As illustrated in FIGS. 2 and 3, the light source 112 is contained within a first light source housing or interior housing 116. The interior housing 116 is constructed to receive the light source 112 and protects the light source 112 from dust and debris. In an embodiment, the interior housing 116 may be formed of a sufficiently rigid plastic, an impregnated plastic/composite material, or the like to prevent damage to the light source 112 while permitting efficient molding or formation of the interior housing 116.

In additional exemplary embodiments, a second light source housing or exterior housing 118 is employed to allow the light source to cantilever as well as rotate above a workpiece surface area. In the embodiment, the exterior housing 118 is cylindrical and includes a recess 120 for receiving the interior housing 116 in which the light source 112 is contained. The recess 120 is defined within the exterior housing 118 so that the light source 112 may provide an indication line to the desired workpiece surface area. Further, in an embodiment, the recess is formed so that the interior housing 116 and thus, the light source 112 may be rotated. The ability to rotate the light source allows one to vary the position of the indication line. For example, the line may be projected towards or away from the saw blade, on either side of the saw blade, or at an angle in-line with the angle of the saw blade. In addition, the second light source or exterior housing 118 may include an aperture for receiving a support utilized to suspend the light source 112 above the workpiece surface area. For example, the exterior housing 118 may be secured to the support via a friction insert, a set screw (through the exterior housing 118), or the like. It is contemplated that alternative methods may be employed to cantilever the light source 112 over the workpiece surface area including the direct placement of the interior light source 116 within a recess formed within a support (the exterior housing being omitted).

In an exemplary embodiment, as illustrated in FIGS. 2 and 3, a lateral arm 122 acts as a support for the exterior housing 118. Preferably, the lateral arm 122 is cylindrical in shape, allowing for easy rotation of the interior housing 116. It is contemplated that the shape of the lateral arm 122 may vary so long as the shape allows the optical alignment system 100 to rotate (e.g., a lateral arm 122 with a rectangular body and a cylindrical end). As provided in FIGS. 2 and 3, the lateral arm 122 includes a first end 124 for coupling with a vertical support 126 allowing the lateral arm 122 and the light source 112 to cantilever above a workpiece surface area (as described in detail below). In addition, the lateral arm 122 includes a second end 128 capable of receiving the exterior housing 118 or in the alternative, the interior housing 116. For example, the second end 128 of the lateral arm 122 is inserted into the aperture defined within the exterior housing 118 and the exterior housing 118 is secured to the lateral arm 122 by friction fit, a set screw, or the like (as described above).

In an additional embodiment, the lateral arm 122 is fixed and a mechanism such as a rack and pinion is utilized to orientate the projected light beam along a plane encompassing the blade, i.e., the path a workpiece will travel when implemented with a table saw. For example, a pin or rod is included on one end of the interior housing 116 which is generally opposite the end in which projects the light source. In such example, the pin may be unitary with the interior housing 116 and extends transverse to the main body of the interior housing 116. Forming the pin unitary with the interior housing 116 may allow for simplified construction and minimize the number of components. The pin or rod may be received within the recess 120 defined within the exterior housing 118 and being shaped corresponding to the size and shape of the pin or rod. In the foregoing manner, using the pin or rod, the interior housing 116 may be swept or positioned at various orientations generally perpendicular to the pin, so as to position the interior housing 116 with respect to the working tool (e.g., saw blade) as well as the desired workpiece surface. See FIG. 4.

Figure 4:
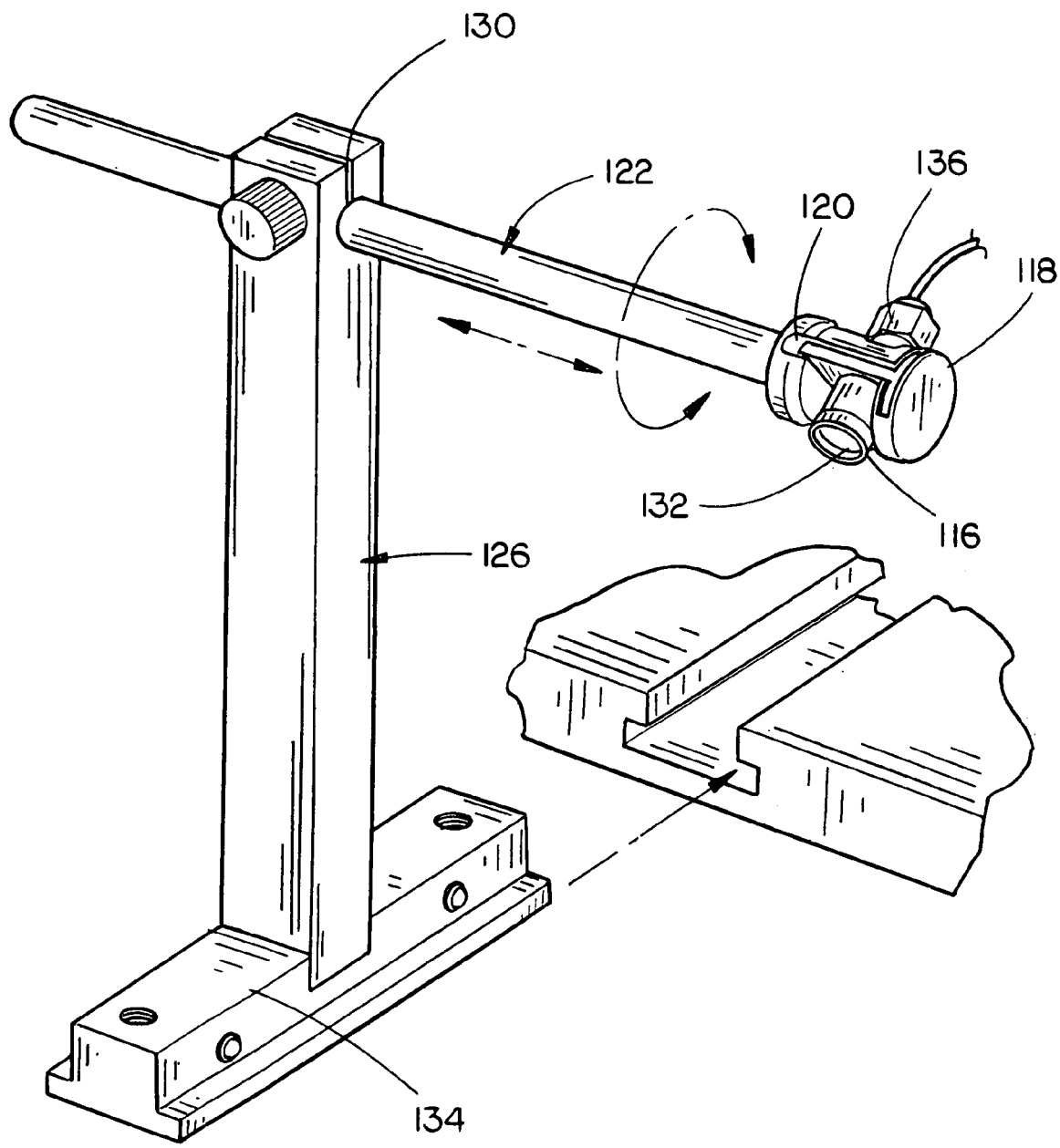
FIG. 4 is a partial exploded view of an optical alignment system in accordance with an exemplary embodiment of the present invention, wherein the optical alignment system includes adjustment and position locking capabilities.

As illustrated in FIGS. 3 and 4, the lateral arm 122 is coupled to an adjustable base. In an exemplary embodiment, the adjustable base includes the vertical support 126 and a horizontal platform 134. In an embodiment, the vertical support 126 allows the lateral arm 122 to cantilever adjacent a working tool interface/workpiece and to project a beam of light onto such area. For example, the vertical support 126 is attached to the horizontal platform 134 so that the vertical support 126 is generally perpendicular to the platform 134. In an advantageous embodiment, the vertical support 126 is rectangular in shape, as the flat surfaces of the sides allow for the formation of an aperture within the vertical support 126 for accepting the lateral arm 122. For example, a horizontal aperture 130 may extend into a side of the vertical support 126, through which the lateral arm 122 may be placed and thereby extend. In turn, the lateral arm 122 may be secured within such position by use of a fastener including a screw, a bolt, or the like. A knob-encased fastener, such as a screw or bolt, may secure the lateral arm 122 by contacting the lateral arm 122 to secure the arm 122 and thus, ultimately the light source 112 in a desired orientation with respect to the saw blade 110. Alternatively, the vertical support 126 may be furcated, and the aperture's diameter may be adjusted by increasing or decreasing the furcation using a threaded fastener thereby clamping or releasing the lateral arm 122.

In an additional exemplary embodiment, a lens 132 may be attached to the interior housing 116 generally opposite to the end of the interior housing 116 coupling with lateral arm 122. Lens attachment may occur via a screw threading, a snap or compression fit, a retaining clip, or the like. The lens 132 may minimize dust collecting in the interior housing 116 to prevent the light source 112 from being damaged or may be utilized to focus the projected/emitted light. In addition, a bezel may be included on the end of the interior housing 116 including the lens 132 for adjusting the lens 132 allowing the light source 112 to be focused.

Referring to FIG. 4, the optical alignment system 100 may be fastened to a workpiece support surface via the horizontal platform 134. In an exemplary embodiment, the horizontal mounting platform 134 is generally T-shaped to fit into a T-slot defined within the workpiece support surface. In the present embodiment, the horizontal platform 134 may be formed with various materials including plastic, metal, a magnetic compound, and the like, so that the platform 134 may be fixed in a desired position during use.

In a further embodiment, as illustrated in FIG. 2, the horizontal platform 134 of the optical alignment system 100 includes a recess. In an exemplary embodiment, the recess houses a knob-encased fastener 138 such as a standard threaded screw or bolt, a friction lock, or the like to increase or reduce tension between the platform 134 of the optical alignment system 100 and a T-slot defined within the workpiece support surface. For example, turning the fastener 138 allows an operator to lock the optical alignment system 100 into position, or slide the optical alignment system 100 along the slot to a new position when the fastener 138 is disengaged. Alternatively, the horizontal platform 134 of the optical alignment system 100 may be furcated and fastened with an alternative fastening method such as with an adjustment knob capable of forcing a portion of the horizontal platform 134 outwardly thereby engaging a sidewall of the groove for securing or sliding the alignment system.

Referring to FIG. 4, the adjustment and position locking capabilities of the optical alignment system 100 are provided. In an exemplary embodiment, the optical alignment system 100 may be rotationally adjusted. It is contemplated that rotation may occur at the point where the lateral arm 122 is secured to the vertical support 126, or at the point where the exterior housing 118 is fastened to the lateral arm 122. Rotation of the lateral arm 122 permits gross adjustment of light source's angle relative to the workpiece, while an additional rotation mechanism 136 may be connected to the interior housing 116 to permit micro-adjustment to ensure accurate alignment with the saw blade 110.

In the present embodiment, as illustrated in FIG. 4, the position of the light source 112 relative to the saw blade 110 may be linearly adjusted. As described previously, the lateral arm 122, which is preferably or substantially cylindrical, may be coupled to the vertical support 126 by engaging with the aperture 130 defined within the vertical support 126. A vertical support adjustment mechanism (e.g., a knob, or the like) may be turned to increase the diameter of the aperture 130 allowing the lateral arm 122 to slide through the aperture 130. The vertical support adjustment mechanism may then be turned the opposite direction to secure the lateral arm 122 in place at the desired position.

In further exemplary embodiments, the light source 112 may be more finely adjusted by employing a rack and pinion or a like mechanism to allow the operator to control fine lateral positioning of the light source. The contemplated adjustment capabilities ensure that the projected light beam is properly laterally aligned with the saw, and allows the operator to adjust the workpiece with respect to the kerf of the saw blade. Similarly, a skew adjustment may also be made such as by including a spring/bolt mechanism, a screw/groove mechanism, or a pivot pin or screw for pivoting the light source 112. In this manner, the position of the optical alignment device may accommodate various saw configurations.

It is further contemplated the optical alignment system 100 may also be adjusted by sliding the horizontal platform 134. For example, turning the knob-encased fastener 138 such as a screw mechanically coupled to horizontal set screws, inset pins, or similar fasteners allows the optical alignment system 100 to slide freely along the T-slot defined within the workpiece surface area by retracting the fasteners. Turning the knob-encased fastener 138 in the opposite direction may release the fasteners and secure the optical alignment system 100 in place at a desired position. In an alternative embodiment, the screws, pins or fasteners may be spring-loaded, whereby retraction or release of the fasteners may be accomplished by depressing or releasing a button located on the horizontal platform 134.

In an alternative embodiment of the present invention, a light source is attached to a lateral arm that takes the form of a generally telescoping rod assembly capable of retracting or extending the light emitting device over a saw blade, allowing for easy incremental adjustment of the laser's position over such saw blade. Further, a series of openings may be provided in the vertical support, to allow for vertical adjustment of the lateral arm, or the vertical support itself may have height adjustment capabilities.

In additional embodiments, it is contemplated that the light source may be electrically powered by a battery or hardwired to a standard electrical source. For example, wiring may be secured to the lateral arm and down the vertical support of the optical alignment system in order to prevent the wiring from entering the cutting path of a saw blade. Alternatively, the light source may be electrically coupled to the saw's electrical system or powered directly from a conventional power source. It is further contemplated that the optical alignment system may be constructed to stand freely or glide along a track instead of a T-slot defined within the workpiece support surface.

It is believed that the present invention and many of its attendant advantages will be understood by the foregoing description, and it will be apparent that various changes may be made without departing from the scope and spirit of the invention or without sacrificing all of its material advantages. The form herein before described being merely an explanatory embodiment thereof, it is the intention of the following claims to encompass and include such changes.

What is claimed is:

1. An optical alignment system for providing a line-of-cut indicator onto a workpiece surface area, comprising:

an optical emitting device for projecting an optical indicator onto the workpiece surface area;

a lateral arm operationally coupled to the optical emitting device for supporting the optical emitting device;

a vertical support constructed to receive the lateral arm for allowing the lateral arm and optical emitting device to cantilever over the workpiece surface area;

means for securing the vertical support to the workpiece surface area, the securing means comprising a horizontal platform being configured to be positioned within a slot defined within the workpiece surface area and including a recess which houses a fastener for allowing the tension between the horizontal platform and the slot defined within the workpiece surface area to be adjusted; and at least one optical emitting device housing substantially enclosing the optical emitting device for operationally coupling the optical emitting device to the lateral arm, wherein the at least one optical emitting device housing is configured so that the optical emitting device may cantilever above the workplace surface area and project a line-of-cut indicator onto the workpiece surface area.

2. The optical alignment system as claimed in claim 1, wherein the optical emitting device is a laser.

3. The optical alignment system as claimed in claim 1, wherein the optical emitting device is a helium-neon laser.

4. The optical alignment system as claimed in claim 1, wherein the at least one optical emitting device housing includes a first optical emitting device housing and a second optical emitting device housing.

5. The optical alignment system as claimed in claim 4, wherein the first optical emitting device housing is a housing which substantially encloses the optical emitting device.

6. The optical alignment system as claimed in claim 4, wherein the second optical emitting device housing is a cylindrical housing including a recess for receiving the first optical emitting device housing which is substantially enclosing the optical emitting device, the second optical emitting device housing attaches to the lateral arm.

7. The optical alignment system as claimed in claim 6, wherein the second optical emitting device housing attaches to the lateral arm via an aperture present within one end of the second optical emitting device housing.

8. The optical alignment system as claimed in claim 1, wherein the means for securing the vertical support to the table saw is a horizontal platform configured to be positioned within a slot defined within the workpiece surface area.

9. The optical alignment system as claimed in claim 1, further comprising a means for adjustment of the optical emitting device so that the optical emitting device emits an optical indicator at a desired position on a workpiece surface area.

10. An optical alignment system for providing a line-of-cut indicator onto a workpiece surface area, comprising:
   an optical emitting system for projecting an optical indicator onto a workpiece surface area, the optical emitting system including a laser, a first laser housing, a second laser housing, and a laser adjustment mechansim, the first laser housing substantially enclosing the optical emitting system and the second laser housing allowing the optical emitting system to be cantilever above the workpiece surface area;
   a lateral arm operationally coupled to the second laser housing of the optical emitting system for allowing the optical emitting system to be cantilever above the workpiece surface area; and
   an adjustable base for supporting the lateral arm, the adjustable base including a vertical support constructed to receive the lateral arm and a horizontal platform for securing the vertical support to the workpiece surface area, the horizontal platform being configured to be positioned within a slot defined within the workpiece surface area, the horizontal platform including a recess which houses a fastener for allowing the tension between the horizontal platform and the slot defined within the workpiece surface area to be adjusted,
   wherein the optical emitting device system and the lateral arm are configured so that the optical emitting system may cantilever above the workpiece surface area and project a line-of-cut indicator onto the workpiece surface area.

11. The optical alignment system as claimed in claim 10, wherein the laser is a helium-neon laser.

12. The optical alignment system as claimed in claim 10, wherein the second laser housing is a cylindrical housing including a recess for receiving the first laser housing.

13. The optical alignment system as claimed in claim 10, wherein the second laser housing attaches to the lateral arm via an aperture present within one end of the second laser housing.

14. The optical alignment system as claimed in claim 10, wherein the vertical support includes a horizontal aperture extending into a side of the vertical support for receiving the lateral arm.

15. The optical alignment system as claimed in claim 14, wherein the lateral arm is secured within the vertical support via a fastener.

16. The optical alignment system as claimed in claim 14, wherein the lateral arm is coupled generally perpendicular to the vertical support to allow for easy rotation and repositioning of the lateral arm.

17. The optical alignment system as claimed in claim 10, wherein the laser adjustment mechanism is operationally coupled to the first laser housing for adjusting the optical indicator emitted from the optical emitting system.

18. The optical alignment system as claimed in claim 10, wherein the slot defined within the workpiece surface area is configured to accept a horizontal platform generally in the shape of a letter T.

19. An optical alignment system for providing a line-of-cut indicator onto a workpiece surface area, comprising:
   an optical emitting system for projecting an optical indicator onto a workpiece surface area, the optical emitting system including a laser, a first laser housing, and a second laser housing, the first laser housing substantially enclosing the optical emitting system and the second laser housing allowing the optical emitting system to be cantilever above the workpiece surface are;
   a lateral arm operationally coupled to the second laser housing of the optical emitting system for allowing the optical emitting system to be cantilever above the workpiece surface area;
   an adjustable base for supporting the lateral arm, the adjustable base including a vertical support constructed to receive the lateral arm and a horizontal platform for securing the vertical support to the workpiece surface area, the horizontal platform being configured to be positioned within a slot defined within the workpiece surface area, the horizontal platform including a recess which houses a fastener for allowing the tension between the horizontal platform and the slot defined within the workpiece surface area to be adjusted; and
   means for adjusting the optical emitting system,
   wherein the means for adjusting the optical emitting system is configured so that the optical emitting system may be adjusted to project a line-of-cut indicator onto the workpiece surface area.

* * * * *